United States Patent [19]

Kidd

[11] 4,269,557

[45] May 26, 1981

[54] AUTOMATIC BAG COLLATING AND STACKING APPARATUS

[75] Inventor: Arthur H. Kidd, Menomonee Falls, Wis.

[73] Assignee: H. G. Weber & Co., Inc., Kiel, Wis.

[21] Appl. No.: 53,027

[22] Filed: Jun. 28, 1979

[51] Int. Cl.[3] ........................ B65G 57/28; B65H 31/06

[52] U.S. Cl. ........................................ 414/105; 414/31; 414/107

[58] Field of Search ................ 93/93 DP, 93 D, 93 C, 93/93 R; 414/31, 30, 105, 55, 107

[56] References Cited

U.S. PATENT DOCUMENTS

| | | | |
|---|---|---|---|
| 3,390,508 | 7/1968 | Heimlicher | 414/31 X |
| 3,404,609 | 10/1968 | Hartbauer et al. | 414/105 X |
| 3,421,758 | 1/1969 | Cole | 414/31 X |
| 3,596,779 | 8/1971 | Osteen | 414/31 |
| 3,624,723 | 11/1971 | Cannon | 414/105 X |
| 3,701,314 | 10/1972 | Tull | 414/31 X |

*Primary Examiner*—James F. Coan

*Attorney, Agent, or Firm*—Hill, Van Santen, Steadman, Chiara & Simpson

[57] ABSTRACT

Apparatus for collecting, counting, stacking, turning over and arranging bags or sacks produced in a high production bag manufacturing machine for assembling and wrapping in desired bundles of uniform dimension for shipment or storage. The apparatus is synchronized with the bag machine to automatically accept the output therefrom for collecting in discrete stacks of a given quantity which are then overturned and fed by a conveyor into a wrapping apparatus with the bottoms of the bags of adjacent stacks positioned at opposite ends for assembling and wrapping in bundles of a uniform thickness to accommodate storage and shipment of the wrapped bundles.

21 Claims, 13 Drawing Figures

AUTOMATIC BAG COLLATING AND STACKING APPARATUS

BACKGROUND OF THE INVENTION

In stacking bags or the like comprising the "quick-opening" or satchel type bag having closed bottom ends that are collapsed and folded back over an open ended body portion, the multi-layered bottom ends of a collated stack will build up quicker than the opposite open end portion of the bags. After only a relatively few bags have been collected in a stack, a slope develops which considerably limits the height to which a stable stack can be formed. Further, bags assembled in bundles of non-uniform thickness would be difficult to package or wrap and present storage, handling, and shipping problems.

Accordingly, in bag packaging operations of the past, only comparatively small quantities of bags could be collected in stacks as they were produced by the bag machine which were then usually hand assembled in larger bundles for wrapping with the bottom and top ends of the small stacks arranged at alternate sides to achieve a desired bundle quantity with substantially uniform thickness.

Obviously, hand operations impose a limiting factor in a packaging operation and with the development of new, high production bag manufacturing machines (800 to 1000 bags formed per min.) hand operations can no longer keep up with these production rates. Even with the development of certain pneumatic collating and stacking machines production rates are limited, since at top speeds of operation these machines can handle only about 650 bags per minute while requiring considerable maintenance and using large volumes of compressed air. Accordingly, it would be a decided advance in the state of the art to provide an automatic collating and stacking apparatus which can accommodate these high performance bag machines.

SUMMARY OF THE INVENTION

An automatic bag collating and stacking apparatus for use in synchronism with a bag producing operation and a subsequent wrapping operation comprising a star-wheel member arranged to receive individual formed and flattened bags from a high capacity bag producing machine and deposit the bags in uniformly counted groups on a collection conveyor.

The bags are supported and guided along the collection conveyor in an upstanding position and after a predetermined quantity have been collected, an intermittently driven conveyor chain advances the bag groups toward a discharge end adjacent to a transfer surface. Spaced fingers or flights attached to the conveyor chain maintain separation between individual counted bag groups and position each group of bags in a vertically aligned stack on the transfer surface adjacent to a first pusher arm of a stack positioning swing frame. The pusher arm oscillates through an angle of 90° to move the stack of bags outward and downstream into a pocket of a turnover wheel while concurrently moving a second pusher arm of the positioning swing frame upstream and inward into position adjacent to the central collection conveyor in readiness to move a subsequently stack of bags, when deposited on the transfer surface, into a pocket of a second turnover wheel, spaced laterally from the first turnover wheel with each turnover wheel spaced an equal distance from the machine center.

The turnover wheels alternately rotate to overturn and advance each stack to a position on a second longitudinal transfer surface whereupon a transverse ram associated with each turnover wheel pushes the stack of bags from a related pocket inward onto a central, horizontal flight conveyor.

The stacks of bags are moved onto the conveyor in timed sequence alternately from each of the turnover wheels to advance along the conveyor length in a spaced orientation with the folded over bottoms of the bags of each adjacent stack being disposed at opposite sides of the conveyor. Movement along the extended length of the conveyor allows for inspection of the bags with the conveyor driven at decelerating speeds when the stacks of bags are moved onto the conveyor and when the stacks are transferred from the conveyor onto a pick-up device. The pick-up device feeds the stacks into a wrapping apparatus for assembly into bundles of uniform thickness to accommodate storage, handling, and shipment.

The present apparatus provides a generally all mechanical arrangement with power to drive the various functional components in timed relationship being driven directly from the bag machine through a power take-off arrangement to deliver a smooth flow of collated, stacked bags to a wrapping apparatus at a rate consistent with high volume bag machines presently being produced. A principal advantage of this mechanically driven arrangement is that the automatic bag collating and stacking apparatus will remain in full synchronization with the bag machine, and require but little maintenance. Conversely a pneumatic drive system would not provide this fail safe synchronization and require considerably more maintenance in addition to using large volumes of compressed air.

It is therefore an object of this invention to provide an automatic bag collating and stacking apparatus for synchronized use with a bag manufacturing machine to arrange the bags in stacks and assemble the stacks for subsequent wrapping in bundles of uniform dimensions.

It is another object of this invention to provide an apparatus for collecting, counting, stacking and collating bags produced in a high production bag manufacturing machine for subsequent wrapping in bundles of uniform dimensions.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE PREFERRED EMBODIMENTS

Figures 1, 9:
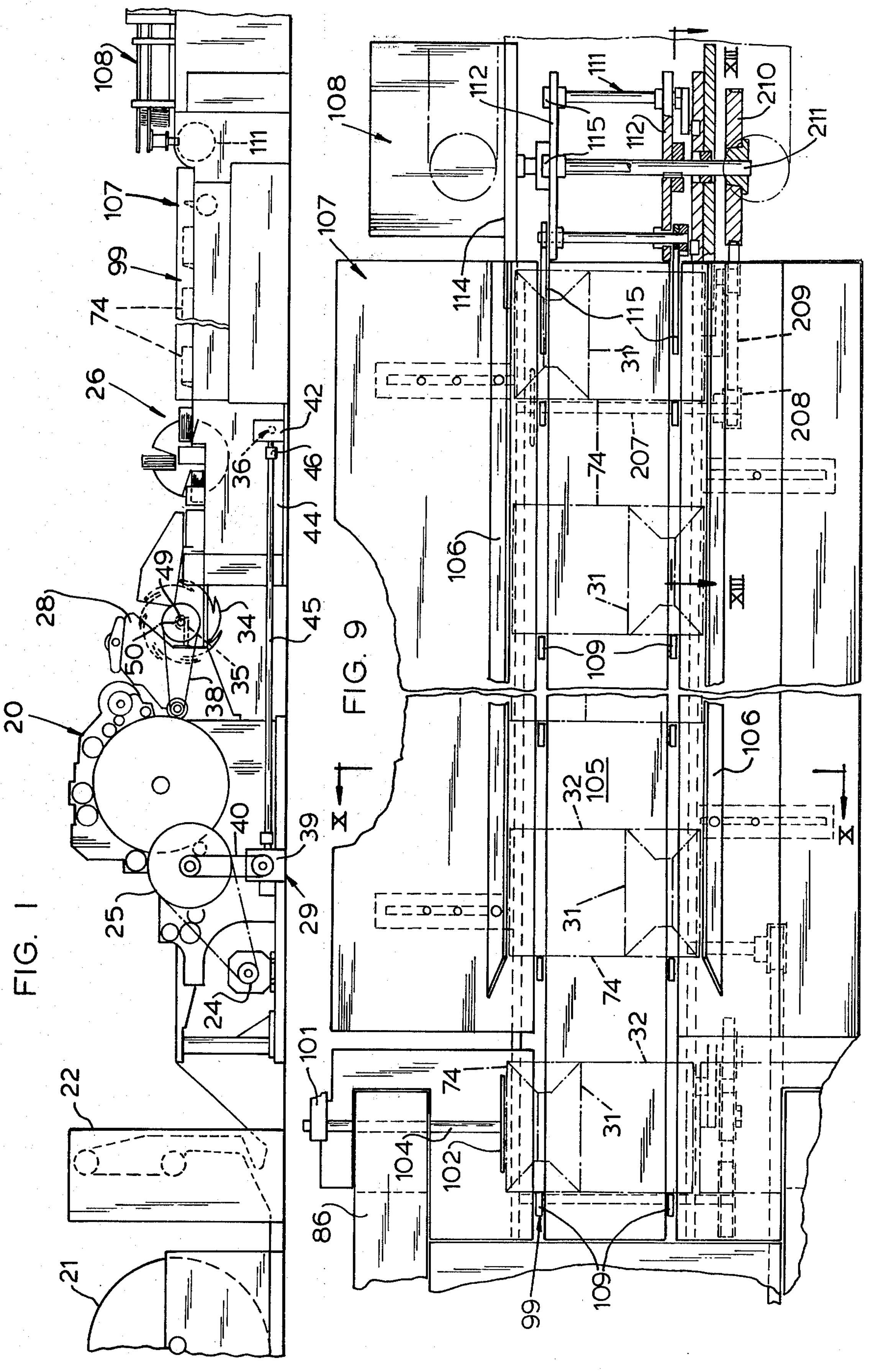
FIG. 1 is a fragmentary elevational view showing the automatic bag collating and stacking apparatus of the present invention employed in a high production bag manufacturing operation.
FIG. 9 is a plan view of the discharge conveyor end of the apparatus.

FIG. 1 illustrates an in-line, continuous bag manufacturing operation having a high speed bag producing machine 20 forming quick opening or satchel type bags automatically from a roll 21 of suitable paper stock. A printing press 22 is shown interposed between the roll 21 and the bag machine 20 to apply desired imprint to the paper stock prior to forming into bags. The bag machine 20 is powered by a motor 24 with all the forming functional elements driven in synchronism through the use of a suitable gear train 25. The bag machine 20 delivers a continuous stream of collapsed and flattened bags, to an automatic bag collating and stacking apparatus 26 which is positioned at a discharge or downstream end 28 thereof. The bag collating and stacking apparatus 26 is synchronized with the bag machine 20 by means of a power take-off arrangement 29 whereby individual flattened bags 30 with closed ends 31 being folded back over an open ended body portion 32 are fed directly into individual bag receiving slots 33 formed about the perimeter of a starwheel 34. A drive train 36 powered by the power take-off arrangement 29 provides a mechanical power distribution arrangement to synchronously drive each of the various functional elements of the apparatus 26 as will be later described in detail. The starwheel 34 is rotatably supported on mounting members 35 carried on the bag machine 20 and is driven from the gear train 25 of the bag machine 20 (see FIG. 1) through the use of a drive timing belt 38.

The power take off arrangement 29 includes a right angle drive gear box 39 supported on the bag machine 20 and driven by a timing belt 40 or the like from the gear train 25 and including a second gear box 42 carried on a main frame 44 of the bag collating and stacking apparatus 26 and being drivably connected with the drive train 36. A propeller shaft 45 drivably connects the gear box 39 to the gear box 42 for transmitting a synchronizing drive from the bag machine 20 to the apparatus 26. Preferably an overloaded clutch 46 is utilized with the propeller shift 45 to protect the drive train 36 against overloads and which is provided with an electrical cut-out switch (not detailed) arranged to interrupt or disconnect electrical power supply to the motor 24.

Figures 3, 6:
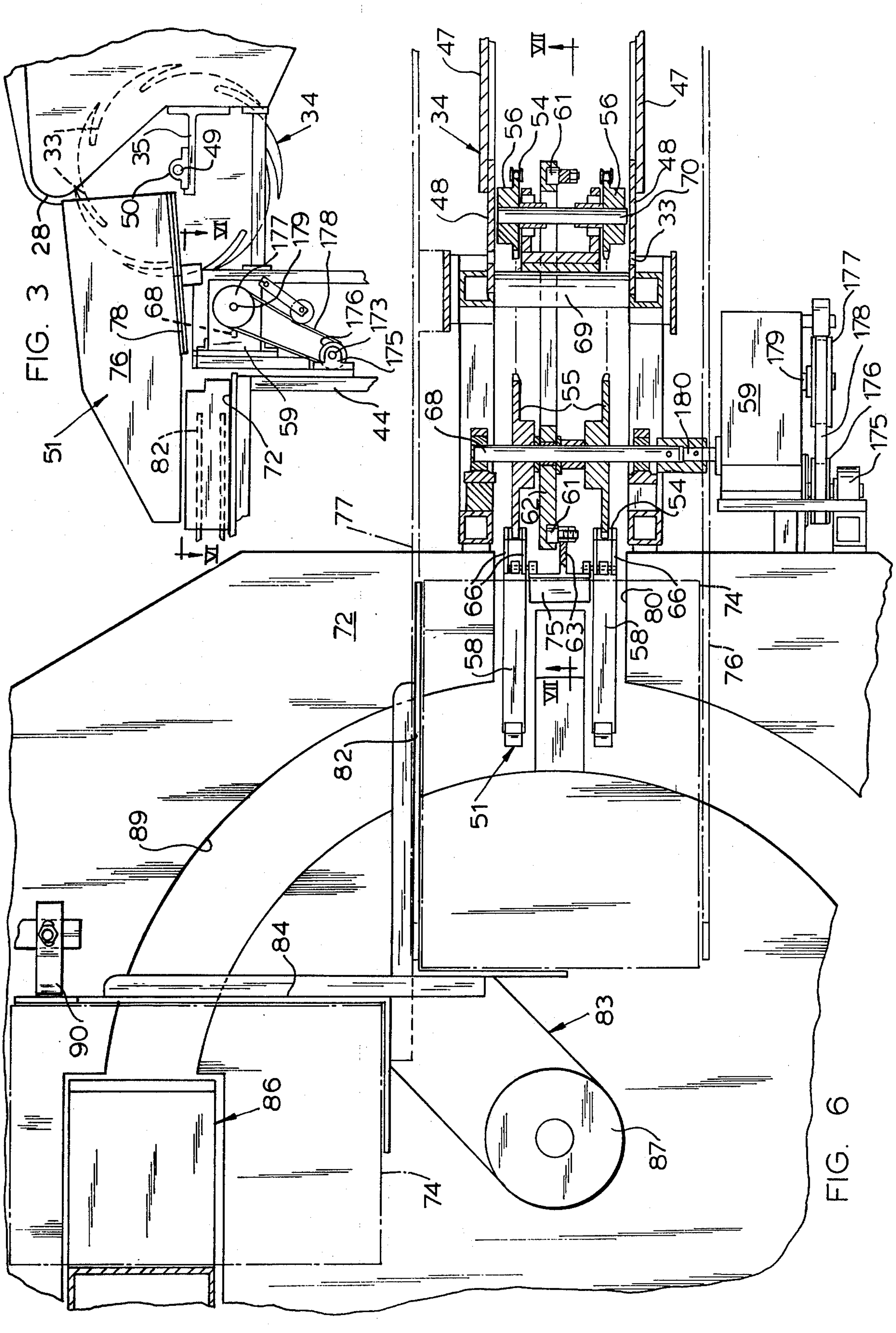
FIG. 3 is a fragmentary side elevational view of the collection conveyor portion of the apparatus.
FIG. 6 is a vertical sectional view taken generally along the line VI—VI of FIG. 3.
Figure 7:
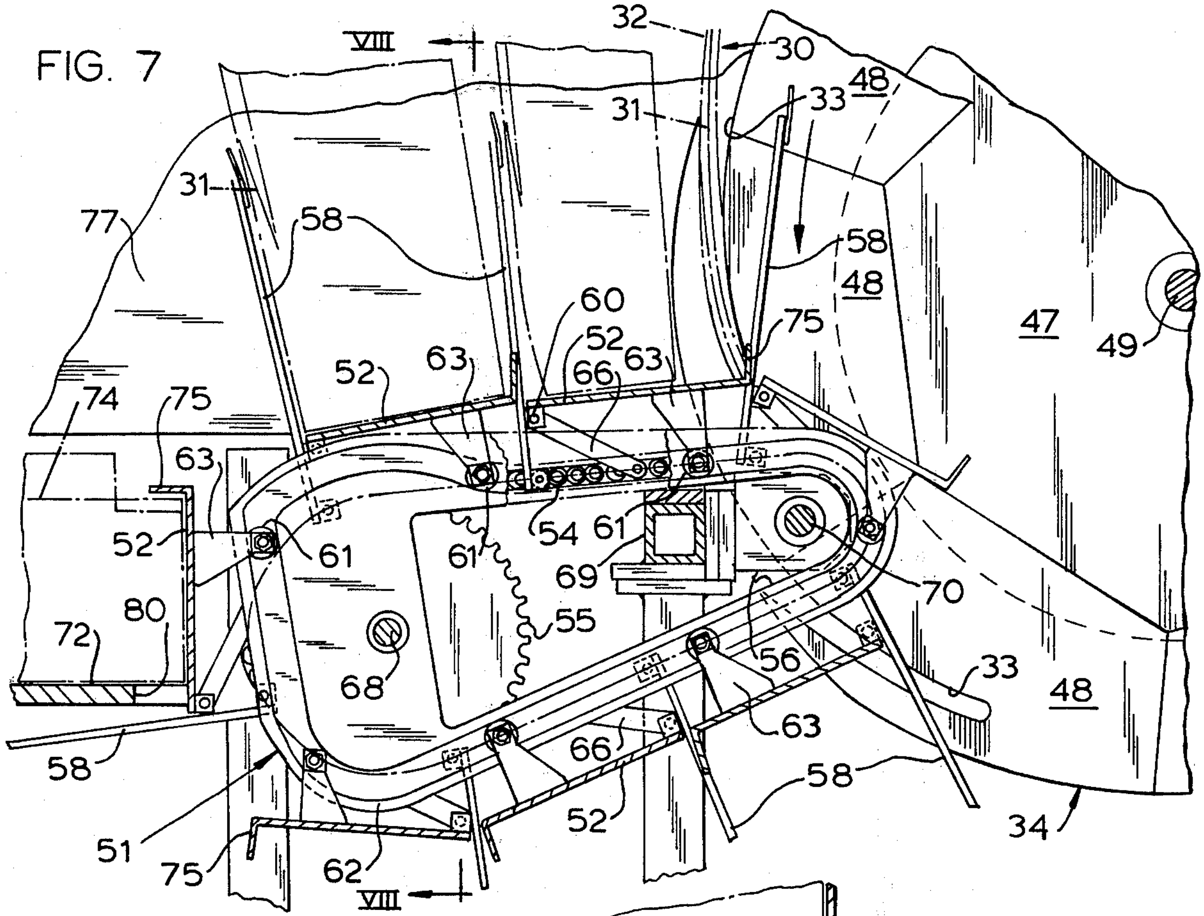
FIG. 7 is a fragmentary vertical sectional view taken generally along the line VII—VII of FIG. 6.

Now with specific reference to FIGS. 3, 6 and 7 of the drawings, it will be seen that the starwheel 34 includes a pair of spaced hub members 47 which carry a series of disc segments 48 in which the bag receiving slots 33 are formed. The starwheel hub members are mounted on a rotatable shaft 49 which is in turn journalled in bearings 50 and supported on the mounting members 35 at a position relative to the discharge end 28 of the bag machine 20. Each completed, flattened bag 30 emerging from the bag machine is intercepted in turn by one of the slots 33 in a timed relationship relative to the production rate.

The bags 30 are carried in the slots 33 around the starwheel 34 downward to a generally vertical position (as best seen in FIG. 7) onto a collection conveyor 51 at which point they are stripped from their respective slots by a bag support flight 52. The support flights 52 are positioned in an intercepting orientation with respect to the bags carried in the slots 33. This positioning is effected by a pair of intermittently driven roller chains 54 each of which are trained about a pair of sprockets 55 and 56. A plurality of flights or fingers 58 are connected to each roller chain in spaced relationship along the length thereof to provide individual collection areas, sequentially positioned relative to the starwheel 34 for a given period by a 90° indexdrive unit 59 to receive a predetermined quantity of bags from the bag machine 20. The collection areas are each defined by leading and trailing fingers 58 carried on each roller chain 54 with a related bag support flight 52 pivotally connected by coupling pins 60 between the leading fingers 58 and with the trailing portion of each flight 52 guided through a predetermined path of travel by means of a cam roller 61 and cam 62. The cam roller 61 is carried from the trailing end of the bag support flight 52 on a leg 63.

Figure 8:
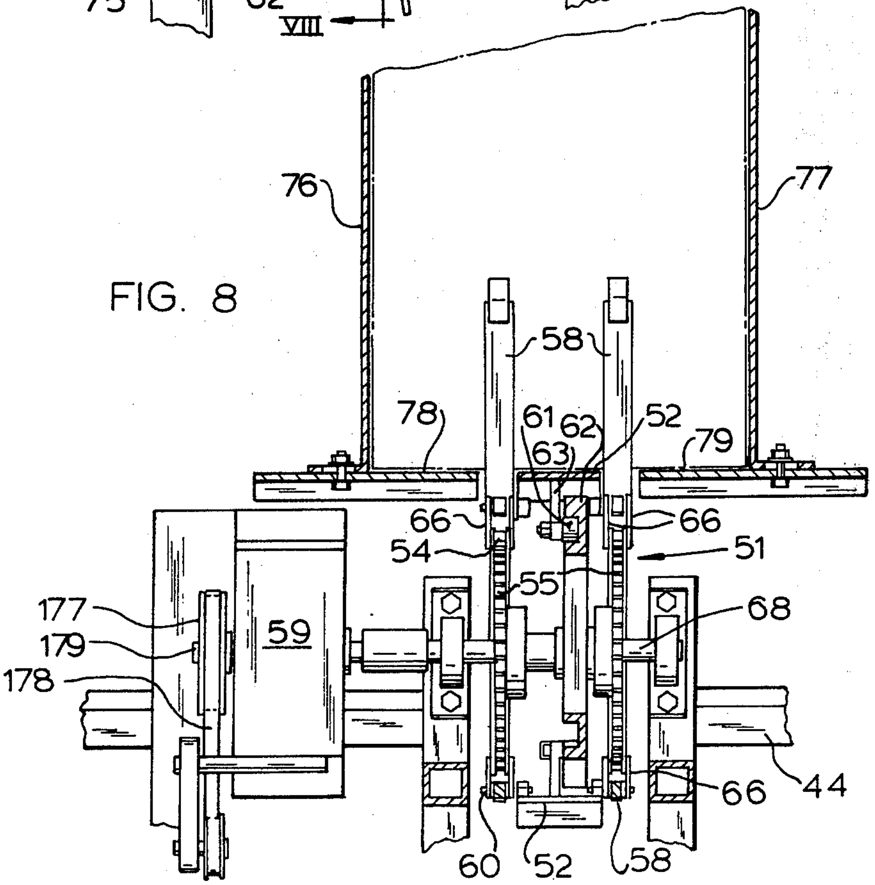
FIG. 8 is a fragmentary transverse sectional view taken generally along the line VIII—VIII of FIG. 7.

A pair of brace links 66 connects to each finger 58 at the coupling pins 60 and to opposite sides of the roller chain 54 to retain the fingers 58 in a stable extended position as best shown in FIGS. 7 and 8. The cam 62 is supported at a down stream end from a driven shaft 68, and at an upstream end on a cross member 69 of the main frame 44. The cross member 69 also supports an idler shaft 70 for the sprockets 56. The sprockets 55 are drivably affixed to the driven shaft 68 for orbitally driving the roller chains 54 to position each collection area in an appropriate bag receiving position for a suitable bag collection period and thereafter advance a given number of collected bags down stream and deposit them on a transfer surface 72 in a vertically aligned stack 74. Herein, the bag support flight 52 and the related fingers 58 with the aid of the cam 62 and roller 61, lower the collected group of bags from an on end position to a flat stacked position while keeping the bags in an aligned orientation. Further, a trailing finger portion 75 of the bag support flight 52 aids in carrying the bags through approximately a 90° repositioning orientation and provide a means of somewhat compressing the bottom closed ends 31 of stacks 74 as deposited on the transfer surface 72.

Side guide walls 76, 77 also aid in maintaining bag alignment and a pair of support guides 78, 79 provide coplanar lateral extensions to the bag support flights 52 for stability in advancing the bags along the collection conveyor 51. As best seen in FIGS. 6 and 7 an open area 80 is provided in the transfer surface 72 to allow the fingers 58 and the finger portion 75 of the support flight to move downward past the transfer surface 72 in rotating with the sprocket 55.

Figures 2, 13:
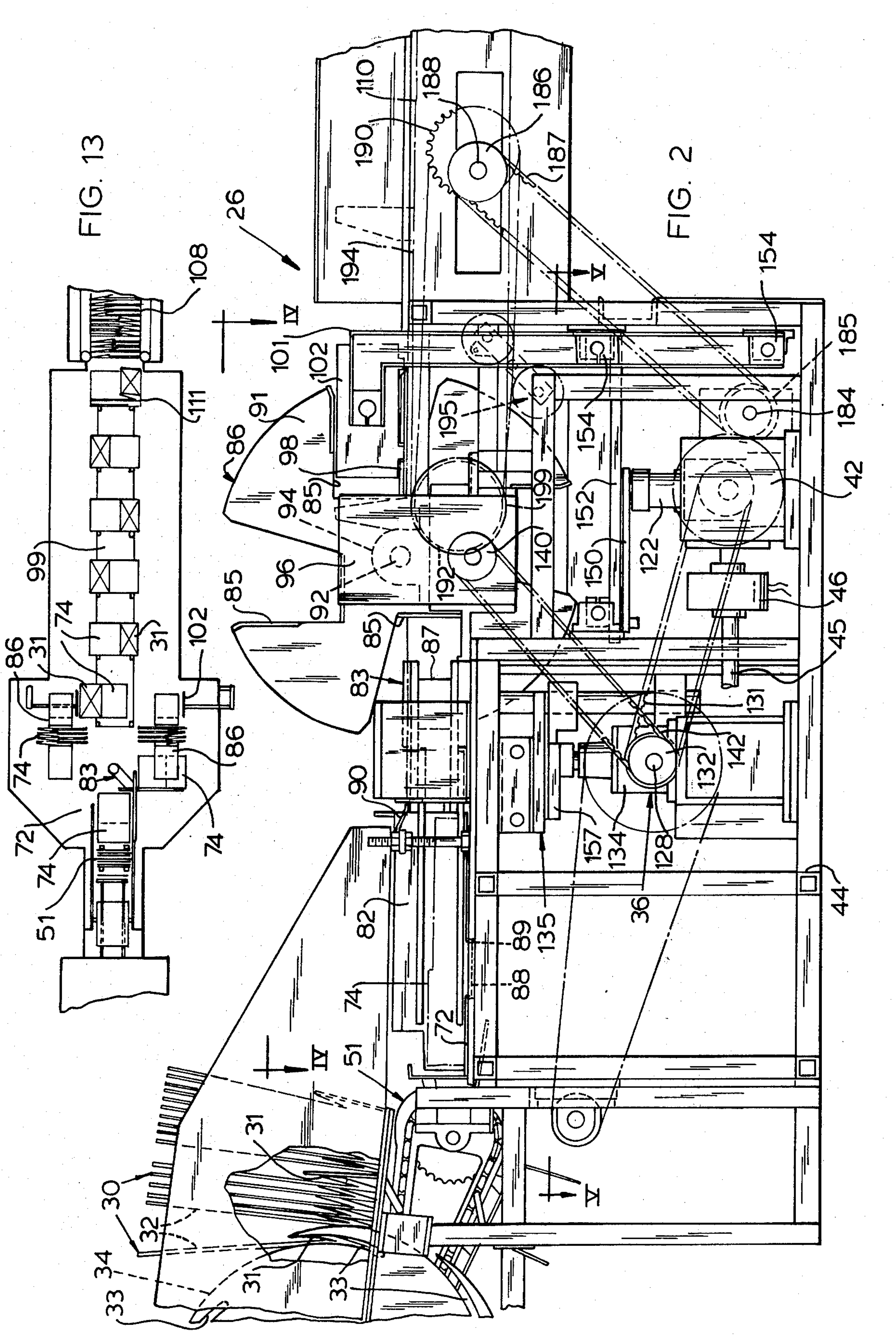
FIG. 2 is an enlarged fragmentary elevational view of the receiver end of the automatic bag collating and stacking apparatus of FIG. 1.
FIG. 13 is a diagrammatic plan view showing the movement of stacked bags along the apparatus.

It will be understood that since the multiple layered closed ends 31 of the bags produce a greater stack height as compared with the open ended portions 32 of the bags. Only a limited number of bags (in the order of twenty-five) can be collected to form a relatively stable although somewhat tapering stack. As shown in FIGS. 2 and 6 the stack 74 is lowered onto the transfer surface 72 by the fingers 58 adjacent a pusher arm 82 of a stack transfer swing frame 83. The swing frame 83 includes a second pusher arm 84 and disposed at a 90° angle relative to the first pusher arm 82. Each of the pusher arms is arranged to move stacks of bags 74 deposited on the transfer surface by the collection conveyor 51 alternately outward and rearward (downstream) into a stack receiving pocket 85 of a related turnover wheel 86 of a pair of spaced turnoverwheels. The pusher arms 82 and 84 are carried on a pivotable support assembly 87 of the swing frame 83 for a 90° oscillating motion wherein each of the pusher arms in turn shuttles a related stack of bags 74 along the transfer surface 72 and into one of the turnover wheel pockets 85.

While one of the pusher arms 84 is moving a stack of bags into position in a related pocket of a first turnover wheel 86, a second pusher arm is concurrently being moved into position adjacent to the discharge end of the collection conveyor 51 in readiness to move a stack of bags 74, subsequently deposited on the transfer surface 72, into a pocket of the second turnover wheel 86. Each of the turnover wheels 86 includes four stack receiving pockets which are positioned by rotational movement of the turnover wheels in a receiving position relative to the transfer surface 72. The turnover wheels are equally spaced apart from the apparatus center whereby stacks of bags loaded into the turnover wheel pockets have been re-oriented 90° in respect to their initial position as deposited on the transfer surface 72; and are oriented in an 180° opposed position relative to one another. Herein, the open ends 32 of the pocketed bags face toward the apparatus center with the closed ends 31 positioned outward.

Figure 4:
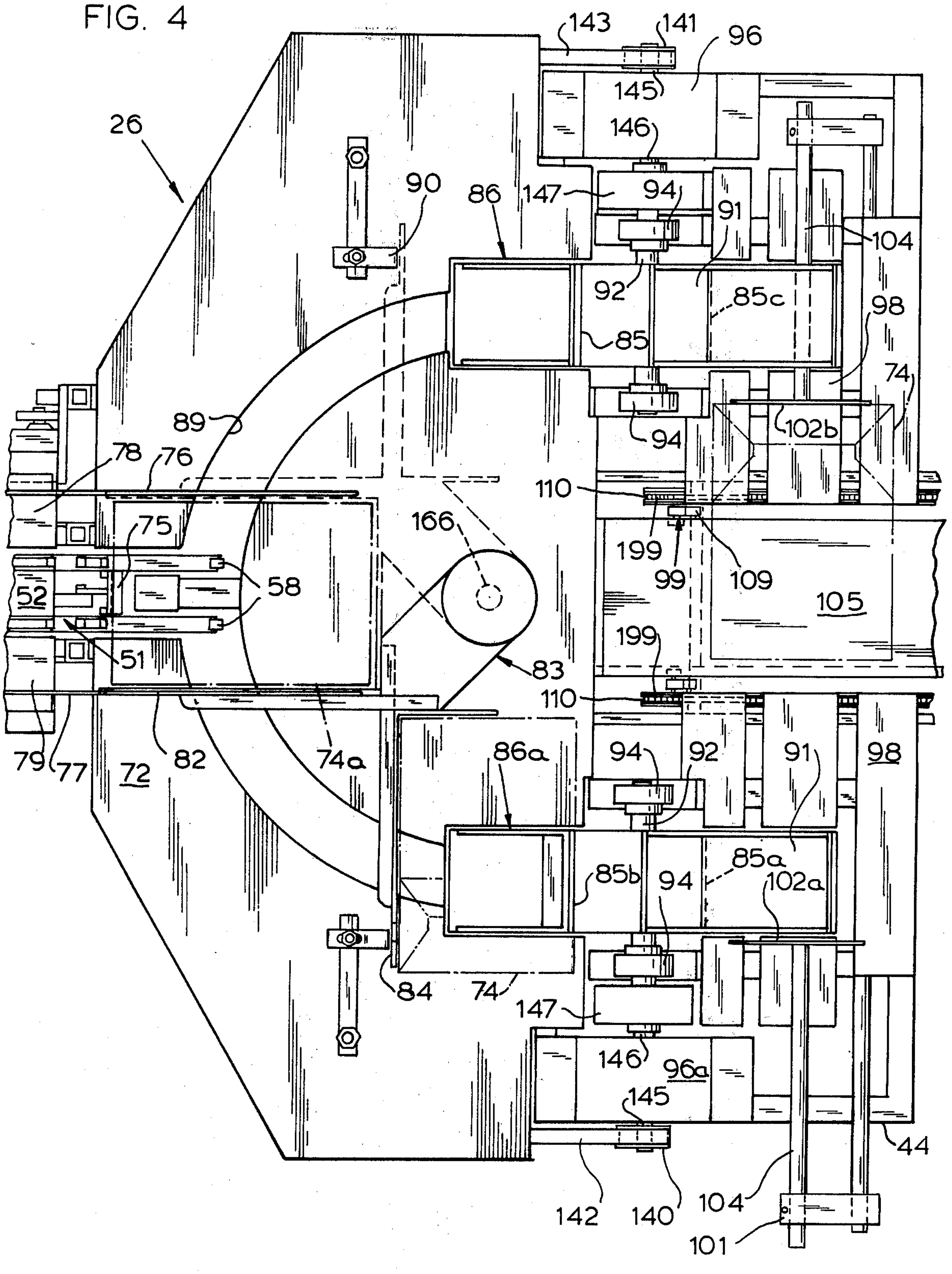
FIG. 4 is a plan view of the apparatus taken along the line IV—IV of FIG. 2.

The pusher arms 82 and 84 are each provided with a pusher projection 88 extending downward into an arcuate slot 89 (see FIG. 2) formed in the transfer surface 72 for positive pushing contact with the bottom bags in the stacks. Further, as seen in FIGS. 2 and 4 a pocket loading guide 90 is provided adjacent each turnover wheel to facilitate loading the stacks of bags 75 into the pockets 85.

Each turnover wheel 86 comprises a drum-like member 91 having the four stack receiving pockets 85 formed therein and being mounted for indexable rotation on a shaft 92. Each shaft 92 is supported on bearings 94 carried on the main frame 44 and is connected to a parallel index drive unit 96 to impart a 90° timed, indexing movement of the bag stacks 74, carried in the pockets 85. Herein, a stack after being loaded into an appropriate pocket by a related pusher arm is rotated first to a vertical position with a first 90° indexing rotation of the turnover wheel 86 and thereafter the stack is overturned with the next 90° indexing rotation. In the overturned position the stacks are moved down stream and into a position coplanar with a second transfer surface 98. As may be seen in FIG. 2, the second transfer surface 98 is at a higher level than the transfer surface 72 and at a level parallel to a central flight conveyor 99.

The turnover wheels 86 thus receive a stack of bags from the pusher arms in a horizontal position in which the bottom closed ends 31 are facing downward and then advance them downstream while overturning the stacks and depositing them on the second transfer surface with the closed folded over ends 31 in full view facing upwards.

The flight conveyor 99 is provided with a variable speed drive arrangement and is positioned between the pair of spaced turnover wheels 86 wherein the overturned stacks of bags 74 may be moved inward along the transfer surface 98 onto the conveyor sequentially and alternately from pockets of the turnover wheels at opposite sides of the coveyor.

A horizontally oscillating transverse frame 101 is provided with a pair of opposed pusher plates 102 adjustably carried thereon for transferring the overturned stacks of bags 74 from the pockets 85 onto the flight conveyor 99. The plates 102 are each affixed to a push rod 104 adjustably carried at opposite ends of the oscillating transverse frame 101 and being cooperative with the transfer surface 98 to slide the stacks from their respective turnover wheel pockets and onto the conveyor 99. Rotational indexing movements of the turnover wheels are synchronized with the oscillating movements of the pusher plates and the travel of the variable speed flight conveyor 99 as will be described later.

With specific reference to FIG. 9 it will be seen that the stacked bags 74 are moved onto the conveyor 99 in aligned orientation for downstream movement along a conveyor pan 105 with the bottom closed ends 31 of the bags 30 arranged at alternate sides of the conveyor. A pair of adjustable side guides 106 are provided to guide the stacks of bags 74 along the length of the conveyor 99 to an unloading end 107 for transferring to a wrapping machine 108. These side guides 106 may be adjusted to accommodate several bag sizes or to provide a desired variation in the overlapping of the bag stacks. The conveyor 99 provides a plurality of upstanding flights 109 connected to a pair of roller chains 110 for advancing each discrete stack of bags 74 along the extended conveyor pan 105 to provide a suitable opportunity for inspection of the printing and general bag quality prior to being unloaded by a pick-up device 111 for feeding into the wrapping machine 108.

Figure 12:
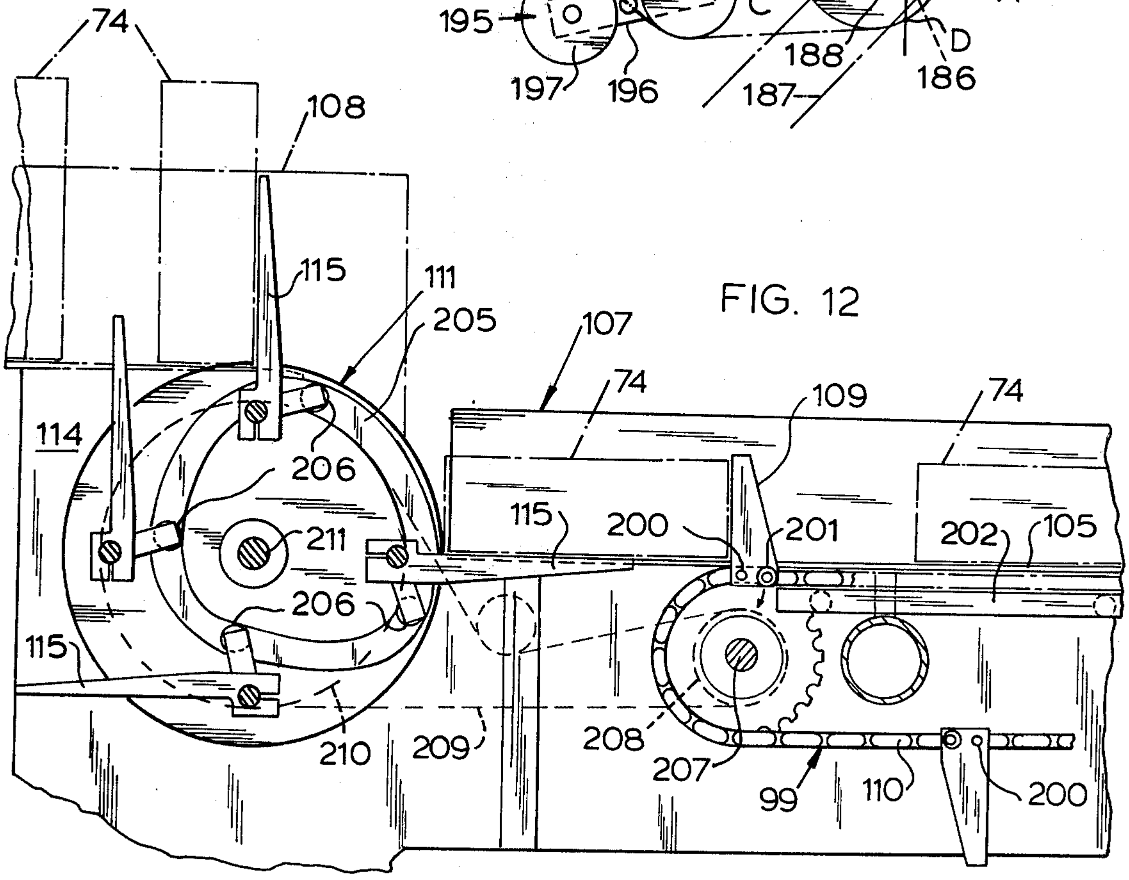
FIG. 12 is a vertical sectional view taken generally along the line XII—XII of FIG. 9.

The pick-up device 111 includes a pair of spaced discs 112 rotatably supported on a discharge support frame 114 and having lifting fingers 115 timed to intercept each stack 74 upon arriving at a predetermined discharge point on the conveyor 99 as seen in FIGS. 9 and 12, and elevate the stacks to an upended position while feeding the stacks into the bundle forming portion of the wrapping machine 108.

The operation of the automatic bag collecting and stacking apparatus 26 as diagrammatically shown in FIG. 13 includes the operating steps of collecting a predetermined quantity of bags produced by the bag machine in the collection conveyor 51 and depositing the predetermined quantity of bags in a vertically aligned stack 74 on a transfer surface 72. The stacks are then moved downstream by a swing frame 83 into pockets of turnover wheels 86 at alternate sides of the apparatus which overturn the stacks 74. At this point the bags are loaded on to the flight conveyor 99 with the close ends 31 up and at opposite sides of the conveyor by pusher plates 102. The flight conveyor 99 conveys the stacks 74 in an aligned spaced orientation to a pick-up device 111 from where they are fed into a wrapping machine for assembly of the stacks into bundles of uniform thickness having the multi-layered closed ends 31 of adjacent stacks positioned at alternate sides of the apparatus. The assembled bundles may then be wrapped in a flat, squared off bundle to accommodate storage and shipping. Thus, it will be recognized that a high degree of synchronization is required in performing the various operating steps.

Accordingly, a reliable driving and sequencing arrangement is provided to power and control the various functional elements of the apparatus 26.

It will be remembered that the power take-off arrangement 29 is powered from the bag machine 20 and drives the gear box 42 which in turn powers the drive train 36. The drive train 36 includes a power shaft 120 drivably coupled at one end thereof to an output shaft 121 of the gear box 42 and connected at a second end to a right angle shaft gear box 122 for powering "a scotch yoke" action drive 123 which powers the oscillating transverse frame 101. Mounted intermediate the shaft ends are a timing belt drive gear 124 and a gear 125 for driving the flight conveyor 99.

A second power shaft 128 rotatably supported on the main frame 44, by means of bearing 129 and having a timing belt gear 130 affixed thereto, is rotatably driven by a timing belt 131 from the gear 124 on the shaft 120. The power shaft 128 carries a timing belt drive gear 132 at one end thereof with a second end of the shaft drivably connected to a right angle drive gear box 134 for powering a second scotch yoke action drive 135 provided to control the motions of the stack transfer swing frame 83. A shaft extension 136 which is rotatably supported on the main frame 44 in axial alignment with the shaft 128 on bearings 137 and is driven from the gear box 134. The shaft 136 is provided with a timing belt drive gear 138 identical to the gear 132. The gears 132 and 138 are each drivably connected to a related gear 140 and 141 by means of a timing belt 142 and 143. The gears 140 and 141 are carried on input shafts 145 of a related one of the parallel index drive units 96. The index drive units 96 may be of any suitable commercial design, which provide a suitable intermittent drive motion such as provided by a "Geneva" mechanism or the like which are well known in the art and the details thereof do not comprise a part of the present invention. The index drive units 96 each include an output shaft 146 which produce a 90° indexing rotation and a 270° dwell period with each 360° rotation of the input shaft 145.

The output shafts 146 are drivably connected to a related shaft 92 of the turnover wheels 86 and are arranged to position the stack receiving pockets 85 sequentially in registration with the transfer surfaces 72 and 98 to accommodate moving the stacks of bags 74 into and out of the pockets as described above. An overload clutch 147 is provided in each of the drive connections between the output shafts 146 and the shafts 92 to provide a safeguard against drive train overloads and may be equipped with an electrical cut-out switch (not detailed) arranged to disconnect the electrical power supply to the motor 24 in the event of an overload condition caused by faulty adjustments broken timing belts, or similar problems which could allow the drive train 36 to lose proper synchronization.

The synchronization of the various functional elements may be better understood when referring to FIG. 4 in which is shown a point in the operating cycle of the apparatus 26 wherein a stack of bags 74 has just been loaded into a waiting pocket 85 of the turnover wheel 86 by the pusher arm 84 and a subsequent counted stack of bags **74*a* has been lowered onto the transfer surface 72 from the collection conveyor 51 along side the second push arm 82. Further, the pusher plate 102*a* is seen having moved downward away from the conveyor 99 and just having cleared the pocket 85*a* of the turnover wheel 86*a* aligned with the transfer surface 98. The pusher plate 102*a* supported from and movable with the transverse oscillatory frame 101 continues its outward movement (downward in FIG. 4) the parallel index-drive unit 96*a* will then be actuated 90° to up end the stack of bags 74 to a vertically oriented position while the stack which was in this position is overturned by the turnover wheel 86*a* and is laid on the transfer surface 98**.

Figure 5:
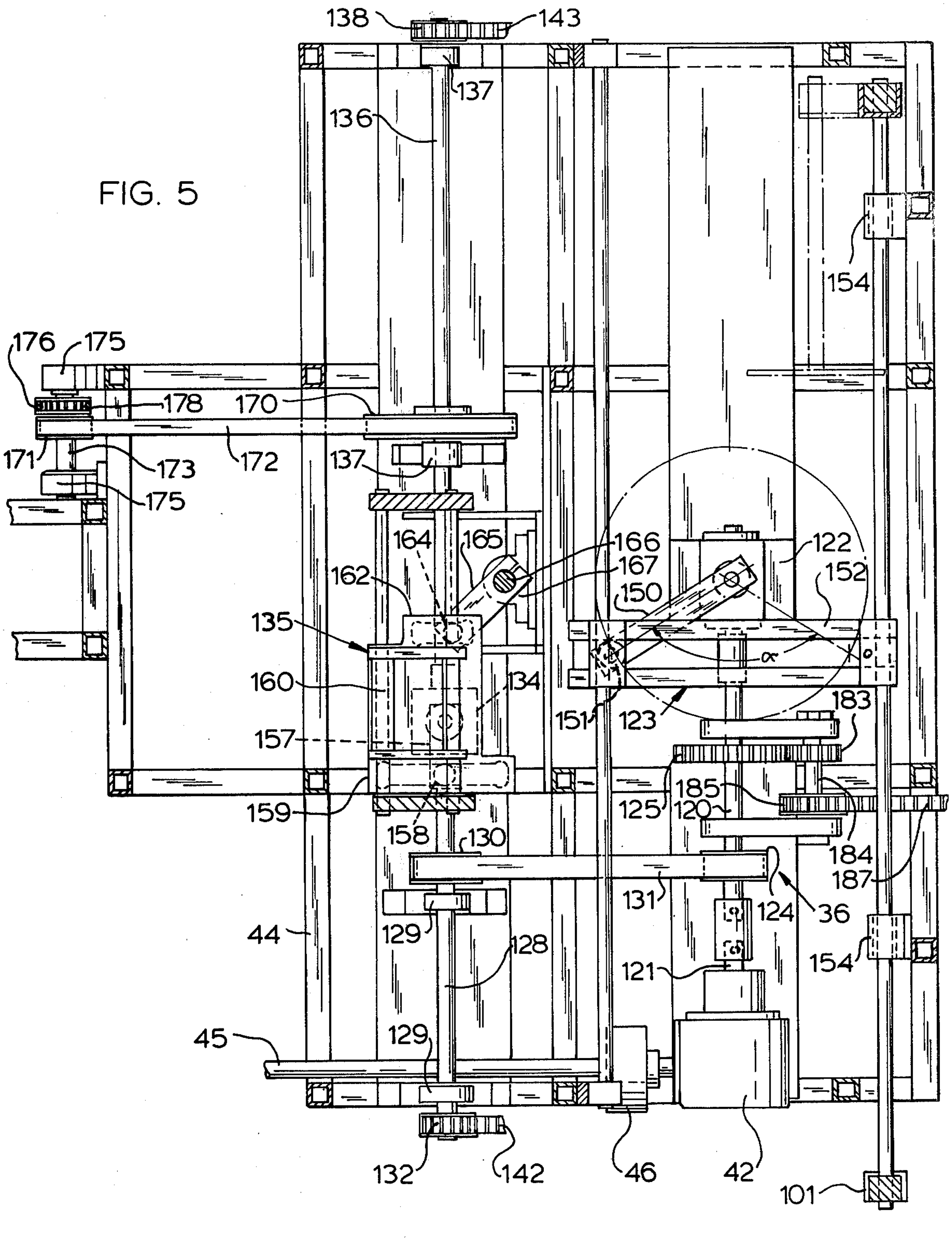
FIG. 5 is a horizontal sectional view showing the mechanical driving arrangement taken generally along the line V—V of FIG. 2.

As best seen in FIGS. 4 and 5 the pusher plate **102*a* remains free of interference with the turnover wheel pocket 85*a* for approximately a 125° rotation of a crank arm 150 which is driven by the gear box 122 and carries a crank roller 151 thereon. The crank roller 151 drivably engages a slotted yoke 152 of the scotch yoke drive 123 which is operatively connected to the transverse frame 101. Thus, it will be seen that rotation of the crank arm 150 imparts a reciprocating motion to the transverse frame 101 and to the pusher plates 102 connected thereto. The transverse frame 101 is supported on the main frame 44 by means of linear bearing 154**.

The 125° rotation of the crank arm 150 associated with a clearance position of the pusher plate **102*a* relative to the turnover wheel 86*a* corresponds to the designated angle $\alpha$ of FIG. 5, during which period of operation the turnover wheel 86*a* is drivably indexed 90% by the index drive unit 96*a* to bring the stack carrying pocket 85*b* into register with the transfer surface 98 and the pusher plate 102*a*. The pusher plate 102*b* at the other side of the apparatus, as shown in FIG. 4, is during this phase of the operating cycle moving through a related pocket 85*c* to move the stack of bags from the pocket and onto the conveyor 99. Obviously, the turnover wheel 86 will remain stationary at this time since the associated index drive unit 96 which drives it is then in its 270° dwell period. Further, as provided by the synchronized drive arrangement the turnover wheel 86 will be rotated to position a stack of bags on the transfer surface 98 only after the pusher plate 102*b* has been moved outward to clear the pocket 85*c***.

In other words, the parallel index drive units 96 are arranged to rotatably index the turnover wheels 86 with a rotational phase differential of 180° whereby the pusher plates 102 move stacks alternately from the two turnover wheels 86 in synchronization and onto the conveyor 99 in a spaced relationship which is in turn synchronized with the travel of the flight conveyor 99. Further, the drive shafts 120 and 128 being driven in synchronization insure that the swing frame 83 is also moved in timed relationship with the indexed rotation of turnover wheels 86. Herein, a crank arm 157, driven by the gear box 134 and provided with a crankroller 158 which operatively engages a slotted yoke 159 of the scotch yoke drive 135 to reciprocally drive a slide frame 160.

The slide frame 160 is mounted on a pair of guide rods 161 which are carried on the main frame 44 for oscillatory movement. A slotted yoke 162 formed as an extension of the slide frame 160 drivably engages a crank pin 164 which is carried on a crank arm 165. The crank arm 165 is drivably secured to a vertical pivot shaft 166 which is pivotally supported on the main frame 44 by means of bearings 167. The stack transfer swing frame 83 is connected to the vertical shaft 166 and is pivotally moved therewith. Thus it will be seen that the swing frame 83 which loads the stacks of bags into the turnover wheel pockets 85 is controlled by the translational movements of the slide frame 160 in response to the drive motion imparted thereto by the scotch yoke drive 135.

The extension shaft 136 rotatably drives a timing belt gear 170 which drivably engages a gear 171 by means of a timing belt 172. The gear 171 is carried on a stub shaft 173 which is rotatably mounted on the main frame 44 by means of bearings 175. A second gear 176 is also carried on the stub shaft 173 and is arranged to drive a gear 177 by means of a timing belt 178. The gear 177 is mounted on a power input shaft 179 of the parallel index drive unit 59 for driving the collection conveyor 51. The index drive unit 59 which is similar to the index drive units 96, provides a 90° indexing rotation of the output shaft 180 and a 270° dwell period with each 360° rotation of the input shaft 179.

Thus, the collection conveyor 51 is synchronously driven by the index drive unit 96 in a stop and go manner to collect a predetermined number of bags from the starwheel 34 in the collection areas between pairs of fingers 58 spaced along the length of the roller chains 54 and thereupon to sequentially deposit these counted groups of bags on the transfer surface 72 in vertically aligned stacks 74 as previously described.

Referring now back to the drive shaft 120 with its driven gear 125, it will be seen from FIG. 5 that a pinion gear 183 meshes with the gear 125 to drive a shaft 184 rotatably supported on the main frame 44. A timing belt gear 185 is secured to the shaft 184 and drives a gear 186 by means of a timing belt 187 (see FIG. 2). The gear 186 is carried on a shaft 188 and drives a gear 190 which is eccentrically mounted on the shaft 188. The eccentrically mounted gear 190 drives a gear 192 carried on the conveyor drive shaft 193 with an accelerating and decelerating rotation as may be best understood with reference to FIG. 11. A timing belt 194 is drivably connected between the eccentric gear 190 and the conveyor gear 192 with a belt take-up device 195 provided in the lower run of the belt. The take-up device 195 includes a pivot support 196 having a pair of idler rollers 197 which are effective to enlarge a bight in the lower run of the timing belt 194 as slack develops therein. The pivot support 196 is rotatably biased to maintain a suitable belt tension by means of a small air cylinder 198.

Figure 11:
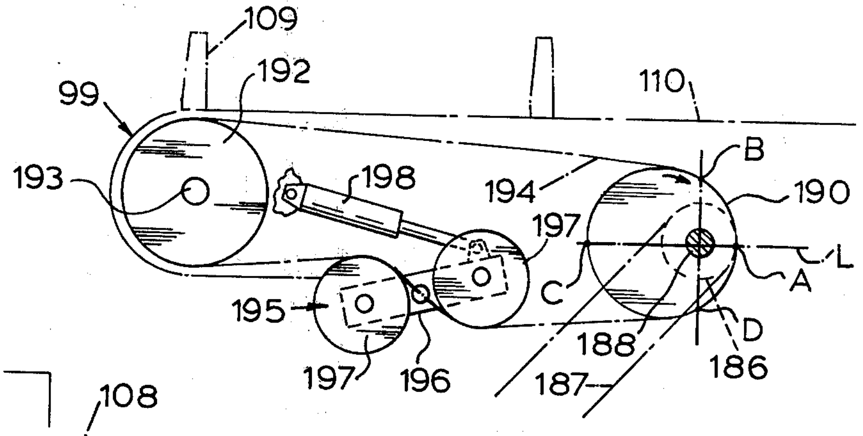
FIG. 11 is a diagrammatic view of the variable speed conveyor drive arrangement.

Now as the eccentric gear 190 is driven by the shaft 188 it may be seen that as starting from the position shown in FIG. 11 in a 360° rotation of the gear each of the indicated points A, B, C and D will each in turn pass a given horizontal line L within a related 90° arc of rotation of the shaft 188 while the linear gear face portions, in driving contact with the timing belt 194, may be seen to vary substantially in dimension. Thus as point B moves toward the line L the belt speed accelerates and consequently the rotational speed of the gear 192 and the conveyor drive shaft 193. Further, not until point C passes the line L does the driven speed of the belt 194 diminish with the timing belt speed decelerating until point A again arrives at the line L. Thus, it will be appreciated that the flight conveyor 99 will be driven at varying speeds. In this variable speed drive arrangement a slack condition will develop in the timing belt 194 by reason of the eccentric travel of the gear 190 which slack is continuously compensated for by means of the device 195 to maintain suitable driving engagement between the gears 190, 192 and the timing belt 194.

The conveyor shaft is rotatably supported on the main frame 44 and is provided with a pair of spaced sprockets 199 each of which drivably engages one of the roller chains 110 of the flight conveyor 99 having the conveying flights 109 attached therealong and arranged to provide a pair of aligned pushing flights 109 to move each stack of bags 74 along the length of the conveyor into the discharge or unloading end 107 of the conveyor 99 with desired fluctuations in conveying speeds. Obviously the stacks of bags 74 are loaded onto the conveyor and unloaded therefrom during periods of decelerated conveyor movement.

Figure 10:
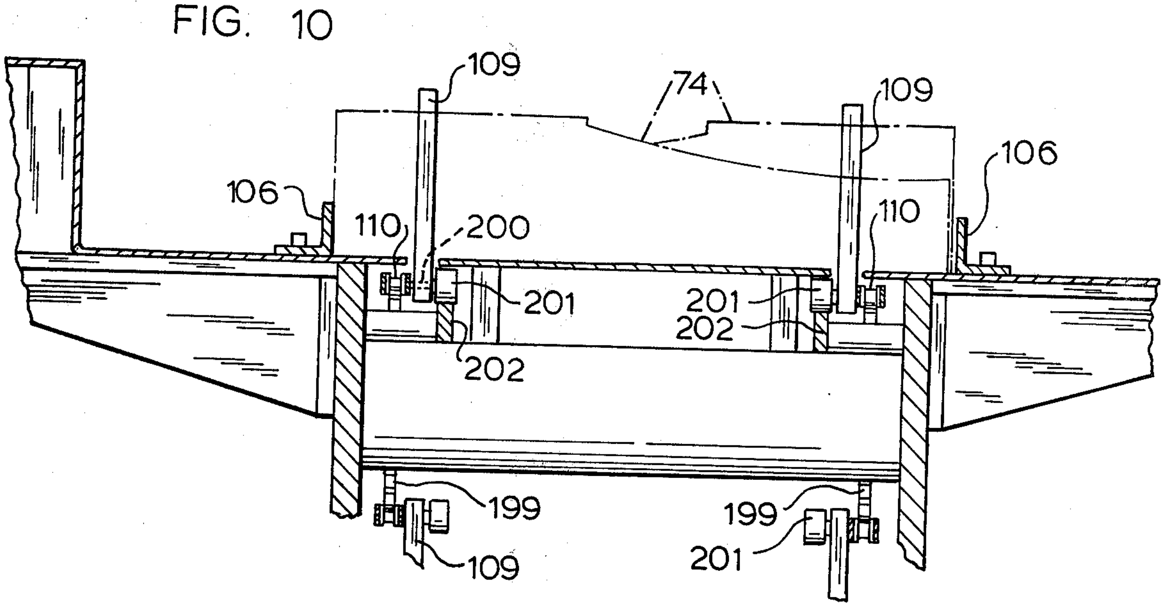
FIG. 10 is a transverse sectional view taken generally along the line X—X of FIG. 9.

As best seen in FIGS. 10 and 12 the conveyor flights 109 are each pivotably supported from the conveyor chains 110 on a pivot pin 200 and are maintained in a vertical extended position for conveying by a roller 201. The roller is guided along the conveyor 99 on rails 202 downstream to the unloading end 107. At this point the rail 202 support terminates and the flights 109 are allowed to pivot backward and downward, away from the stack 74 to accommodate lifting the stack (shown in broken lines) from the conveyor pan 105 by the pair of lifting fingers 115 carried on the pick up device 111. The lifting fingers 115 are moved through a desired bag lifting and up-ending path to load the stack into the wrapping machine 108 for assembly into bundles of desired dimension. The paths of lifting fingers 115 are controlled by a cam member 205 with which camming rollers 206 carried on the lifting fingers 115 cooperate to regulate the angular positions of the fingers 115. Further, the pick-up device 111 is synchronizingly driven by the flight conveyor 99 from a tail shaft 207. A timing belt gear 208 keyed to the shaft 207 drives a timing belt 209 which drivably engages a gear 210 secured to a shaft 211. The shaft 211 drivably supports the pick-up device 111 which feeds the stacks of bags 74 into the wrapping machine 108 with the closed ends 31 of alternating adjacent stacks positioned at opposite sides of the machine to form bundles which are substantially uniform in thickness to accommodate shipping and storage of the bundles wrapped by the machine 108.

I claim as my invention:

1. An automatic bag stacking and collating apparatus for use with a high capacity bag manufacturing machine, which is powered by a suitable drive means and which bag machine produces bags with closed bottom ends said apparatus comprising:

- a frame having a receiving end portion, a transfer surface, and an unloading end portion,
- a plurality of bag handling functional devices including:
  - a receiving means positioned adjacent to said bag machine and arranged to receive flattened bags from said bag machine,
  - a collection means carried on said frame at said receiving end portion and arranged to separate predetermined quantities of bags received from said receiving means into groups and to periodically deposit
  - a collected group on said transfer surface in a flat orientation with side edges of said bags aligned to form a vertically aligned stack,
  - a pair of laterally spaced turnover devices positioned downstream and laterally outward of said collection means for overturning said vertically aligned stacks of bags, a transfer swing means movable along said transfer surface to load said flat oriented and vertically aligned stacks of bags deposited on said transfer surface into the pair of turnover devices in an alternating sequence with said bag closed bottom ends positioned in opposing orientation relative to one another, a conveyor means positioned between said pair of turnover devices and arranged to advance said overturned stacks of bags to said unloading end portion in spaced aligned orientation, means to transfer said overturned stacks of bags alternately from said pair of turnover devices and onto said conveyor means, means for transferring said stacks of bags from said conveyor means and into a wrapping machine, a drive arrangement for said bag stacking and collating apparatus arranged to synchronously drive each of the plurality of bag handling functional devices whereby individual bags are received from the bag machine and are automatically collected in stacks of a given quantity, said stacks are repositioned to place their closed bottom ends in opposing orientation relative to one another and are overturned and arranged in an aligned and spaced orientation for conveying down stream for assembling a plurality of stacks into bundles of a generally uniform thickness to facilitate wrapping and storage.

2. The automatic bag stacking and collating apparatus according to claim 1 wherein said drive-arrangement includes a mechanical drive synchronizing system to control each of said plurality of bag handling functional devices in synchronism.

3. The automatic bag stacking and collating apparatus according to claim 2 wherein said drive arrangement is powered by said bag machine drive means.

4. The automatic bag stacking and collating apparatus according to claim 3, wherein said receiving means comprises a starwheel having a plurality of bag receiving slots therein for intercepting individual flattened bags as produced by the bag machine and load them into said collection means.

5. The automatic bag stacking and collating apparatus according to claim 4, wherein said collection means comprises a collection conveyor providing means to collect given numbers of bags in groups, to advance each group of bags along said collection conveyor and to sequentially deposit each individual group of bags on said transfer surface in a horizontal and flat orientation with side edges of said bags aligned vertically adjacent to said transfer means.

6. The automatic bag stacking and collating apparatus according to claim 5, wherein said collection conveyor comprises a pair of roller chains having spaced group separating fingers and bag supporting flights carried thereon to intercept bags from said starwheel and separate them into groups of a given number, said roller chains having an intermittent drive means to advance said separated group for deposit on said transfer surface.

7. The automatic bag stacking and collating apparatus according to claim 6, wherein said bag supporting flights are directed through a given path by a cam means to deposit said group of bags on said transfer surface in said vertically aligned stack.

8. The automatic bag stacking and collating apparatus according to claim 5, wherein said transfer means comprises a stack transfer swing frame adapted to reposition each vertically aligned stack of bags, in turn, 90° relative to their position as deposited on said transfer surface and reposition said stacks of bags 180° relative to one another.

9. The automatic bag stacking and collating apparatus according to claim 8, wherein said swing frame includes a pair of pusher arms disposed at right angles relative to one another and pivotably movable with said swing frame along said transfer surface whereby a first of said pair of pusher arms loads a vertically aligned stack of bags into a first of said pair of turnover devices concurrently with positioning a second of said pair of pusher arms in a location adjacent to said collection conveyor in preparation to load a stack of bags subsequently deposited on said transfer surface into a second of said pair of turnover devices, whereby stacks of bags deposited on said transfer surface are alternately loaded into said pair of turnover devices.

10. The automatic bag stacking and collating apparatus according to claim 9, wherein said swing frame is oscillatively driven by a scotch yoke action drive means.

11. The automatic bag stacking and collating apparatus according to claim 9, wherein said pair of turnover devices each include a rotatable turnover wheel having at least two stack receiving pockets therein and each having a intermittent rotary drive means of said drive arrangement connected thereto to sequentially overturn said stacks of bags loaded unto said turnover devices.

12. The automatic bag stacking and collating apparatus according to claim 11, wherein said intermittent rotary drive means includes an overload clutch arranged to shut down the drive means for said bag manufacturing machine upon encountering an overload condition.

13. The automatic bag stacking and collating apparatus according to claim 11, wherein said means to transfer said overturned stacks of bags from said turnover wheels and onto said conveyor means comprise a transverse frame having a pair of pusher plates carried on opposite ends thereof, said drive arrangement includes a reciprocating drive means to drive said transverse frame wherein each pusher plate of said pair of pusher plates is adapted to transfer an overturned stack of bags from a pocket of a related turnover wheel and onto said conveyor means in an alternating sequence.

14. The automatic bag stacking and collating apparatus according to claim 13, wherein said reciprocating drive means comprises a scotch yoke action drive means.

15. The automatic bag stacking and collating apparatus according to claim 13, wherein said conveyor means includes a pair of roller chains having spaced flights carried thereon for advancing said stacks of bags to said unloading end portion.

16. The automatic bag stacking and collating apparatus according to claim 15, wherein said drive arrangement includes a variable speed drive means to power said conveyor means whereby said overturned stacks of bags are moved onto and removed from the conveyor means when said variable speed drive means drives the conveyor means at a reduced speed.

17. The automatic bag stacking and collating apparatus according to claim 15, wherein said means for transferring said stacks of bags from said conveyor means and into a wrapping machine comprises an unloading means which is synchroniously driven by the conveyor means.

18. The automatic bag stacking and collating apparatus according to claim 17, wherein said unloading means includes a plurality of lifting fingers which are arranged to load individual stacks of bags into said wrapping machine for assembling a plurality of stacks into bundles.

19. The automatic bag stacking and collating apparatus according to claim 18, wherein said plurality of lifting fingers are supported on a rotary member which is driven by said conveyor means and said fingers are guided in a predetermined lifting path by a related camming means whereby said stacks are upended for assembling into bundles.

20. An apparatus for automatically stacking and collating flattened bags with folded-over closed bottom ends as produced by a bag manufacturing machine, for arranging in stacks and assembling a plurality of stacks in bundles of generally uniform thickness comprising:

a collection means arranged to continuously receive individual flattened bags from said bag manufacturing machine and separate given quantities of bags into stacks, means to periodically deposit individual stacks of bags onto a transfer surface in a flat orientation with side edges of said bags being vertically aligned, means to sequentially reposition said stacks of bags from a position as deposited on the transfer surface while moving said stacks along said transfer surface comprising a swing frame having pusher arm means being operable to reposition said stacks of bags with said closed bottom ends in each stack being in opposed orientation to the closed bottom ends of alternately repositioned stacks of bags, a turnover means adapted to receive said stacks of bags with closed bottom ends of successive repositioned stacks of bags in opposing orientation and sequentially overturning successive repositioned stacks of bags, a conveyor means arranged to receive repositioned and overturned stacks of bags for conveying therealong in a spaced and aligned orientation, and a transfer means arranged to move said repositioned and overturned stacks of bags sequentially onto said conveyor means, whereby a given number of repositioned and overturned bags are advanced to an apparatus for assembly into bundles of a generally uniform thickness to accommodate wrapping and storage.

21. The apparatus according to claim 20 further including a mechanical drive synchronizing system to synchronously control the operation of the apparatus.

* * * * *